(12) United States Patent
Fujita et al.

(10) Patent No.: US 6,716,553 B1
(45) Date of Patent: *Apr. 6, 2004

(54) POROUS FILMS AND PROCESSES FOR THE PRODUCTION THEREOF

(75) Inventors: Shigeru Fujita, Ibaraka (JP); Kazushige Yamamoto, Ibaraki (JP); Shunsuke Noumi, Ibaraki (JP); Yoshihiro Uetani, Ibaraki (JP); Hideyuki Emori, Ibaraki (JP); Yutaka Kishii, Ibaraki (JP); Yutaka Yamamura, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/743,109

(22) PCT Filed: Apr. 28, 2000

(86) PCT No.: PCT/JP00/02806

§ 371 (c)(1), (2), (4) Date: Jan. 5, 2001

(87) PCT Pub. No.: WO00/68305

PCT Pub. Date: Nov. 16, 2000

(30) Foreign Application Priority Data

May 7, 1999 (JP) ............................................. 11-127569

(51) Int. Cl.[7] ................................................. H01M 2/16
(52) U.S. Cl. ....................... 429/145; 429/249; 526/250; 526/352; 264/402; 525/210
(58) Field of Search .......................... 526/348; 429/247, 429/129, 145, 249; 546/280, 352; 264/402; 521/134; 525/210, 216; 428/220

(56) References Cited

U.S. PATENT DOCUMENTS

| | | | | |
|---|---|---|---|---|
| 3,351,495 A | * | 11/1967 | Larsen et al. | 210/500.36 |
| 4,699,857 A | * | 10/1987 | Giovanni et al. | 429/204 |
| 5,266,666 A | * | 11/1993 | Kamiishi et al. | 526/125 |
| 5,895,800 A | * | 4/1999 | Kataoka et al. | 525/286 |
| 6,559,195 B1 | * | 5/2003 | Yamamoto et al. | 521/134 |

FOREIGN PATENT DOCUMENTS

| | | |
|---|---|---|
| EP | 384693 | 2/1990 |
| EP | 845490 | 6/1998 |
| JP | 1-18091 | 4/1989 |
| JP | 02-289632 | 11/1990 |
| JP | 3-277638 | 12/1991 |
| JP | 5-230253 | 9/1993 |
| JP | 5-271452 | 10/1993 |
| JP | 6-145408 | 5/1994 |
| JP | 06-163023 | 6/1994 |
| JP | 6-53826 | 7/1994 |
| JP | 7-133363 | 5/1995 |
| JP | 08-138644 | 5/1996 |
| JP | 09-169867 | 6/1997 |
| JP | 10-330560 | 12/1998 |
| JP | 11-100454 | 4/1999 |
| JP | 11-288741 | 10/1999 |
| JP | 11-293030 | 10/1999 |
| JP | 2000-107578 | 4/2000 |

\* cited by examiner

*Primary Examiner*—Patrick Ryan
*Assistant Examiner*—Julian Mercado
(74) *Attorney, Agent, or Firm*—Birch, Stewart, Kolasch & Birch, LLP

(57) ABSTRACT

There are provided a porous film comprising a polymer composition comprising (a) a polymer having C=C double bond and an aliphatic ring having 5 to 10 carbon atoms in a main chain thereof; and (b) another resin; a porous film, wherein all or a part of C=C double bond in the (a) polymer is disappeared; and a porous film, wherein the (a) polymer and the (b) resin are cross-linked therebetween. The porous film has appropriate porosity, air permeability and puncture strength, and is especially excellent in latent heat resistance or heat resistance. Further, there are provided a process for producing the porous film; a separator for a battery comprising the porous film; and a battery comprising the separator.

12 Claims, 2 Drawing Sheets

POROUS FILMS AND PROCESSES FOR THE PRODUCTION THEREOF

This application is the national phase under 35 U.S.C. §371 of PCT International Application No. PCT/JP00/02806 which has an International filing date of Apr. 28, 2000, which designated the United States of America.

TECHNICAL FIELD

The present invention relates to a porous film, a process for producing the same and its use. More particularly, the present invention relates to a porous film which is excellent in latent heat resistance or heat resistance, a process for producing the same and its use.

BACKGROUND ART

Conventionally, various types of batteries have been actually used. Recently, in order to meet the needs for making electronic devices cordless, or the like, a lithium battery, which has a light weight, is capable of obtaining a high electromotive force and high energy, and has low self-discharge, has been sought. For instance, lithium secondary batteries have been used in large amounts for cellular phones and notebook computers, and they are further expected to be used for batteries for electric automobiles in the future.

In general, in the lithium battery described above, there is provided a separator between a positive electrode and a negative electrode, the separator functioning to prevent short-circuit between these electrodes. As the separator mentioned above, a porous film having a large number of micropores has been usually used for securing transmission of ions existing between the positive electrode and negative electrode.

As the separator for batteries mentioned above, there have been proposed various porous films each comprising an ultra-high molecular polyolefin resin and additionally another polyolefin resin. For instance, Japanese Examined Patent Publication No. Hei 6-53826 discloses a porous film comprising an ultra-high molecular polyethylene resin having a weight-average molecular weight of $5 \times 10^5$ or more.

However, in order to actually use these porous films, each comprising a polyolefin resin for a separator for batteries, especially for batteries for electric automobiles, their heat resistance cannot be said to be sufficient.

In addition, there has been proposed a porous film further comprising a rubber in addition to the polyolefin resin. For instance, Japanese Examined Patent Publication No. Hei 1-18091 discloses a porous film formulated with a liquid rubber for the purposes in the improvements in stretchability, flexibility, tear strength, moisture permeability, and the like. Japanese Patent Laid-Open No. Hei 9-169867 discloses a microporous film added with a hydrogenated styrene-butadiene block copolymer for the purposes of giving uniform structure and high puncture strength. In addition, Japanese Patent Laid-Open Nos. Hei 6-163023 and Hei 8-138644 each discloses a battery separator comprising ethylene-propylene rubber, for the purposes of imparting a balance in the mechanical strength and improving the impregnation ability of electrolyte.

However, none of these inventions are designed to improve heat resistance, and they neither disclose nor suggest heat resistant properties.

The problems seen in the actual use of a battery, such as in the case of the lithium battery, include the possibility that when the battery is allowed to stand in an unusually high temperature, or over-charged, or when the short-circuit is caused between the electrodes in the internal or external of the battery, the battery generates an unusual amount of heat, so that an electrolyte in the internal of the battery is discharged to the external of the battery by their dramatic temperature spike. Although various safety devices for temperature spikes are assembled in a single battery cell or a group of battery cells, their effectivity is low for a dramatic temperature spike when partially short-circuited, or the like.

Causations for such unusually high temperature spikes include external short-circuiting, forced discharging, over-charge, precipitation of dendrites, internal short-circuiting caused by penetration of battery with a projected object (so called "nail-penetrating"), allowing to stand in an unusually high temperature, and the like.

In addition, in the case of a battery for electric automobiles, single battery cells are subject to high-output, and such battery cells are used in a large number, so that there is a large risk that unusual heat generation takes place. Especially, when automobile accident and the like are considered, there cannot be completely eliminated unpredictable unusual factors such as surrounding temperature increase caused by short-circuiting by battery penetration or the like. In such a case, when an unusual heat generation takes place in one of the battery cells, there arises a risk of causing secondary and tertiary casualties. Since a large number of battery cells are collectively used in electric automobiles, the safety for individual battery cells would become increasingly important.

In view of these circumstances, a separator primarily having a function of preventing short-circuiting between the electrodes has been expected to have excellent heat resistance, so that the short-circuiting can be prevented even under unusually high temperatures. In addition, as described above, a wide range of short-circuiting can be prevented between the electrodes, if the separator has a sufficient heat resistance not to be melted, deformed, or broken up to high temperatures, so that effects of preventing casualties caused by unusual heat generation of batteries and the like can be expected.

An object of the present invention is to provide a porous film having appropriate porosity, air permeability and puncture strength, and being especially excellent in latent heat resistance or heat resistance, and a process for producing the same; further a separator for a battery comprising the porous film; and a battery comprising the separator.

DISCLOSURE OF INVENTION

As a result of intensive studies in order to solve the problems mentioned above, the present inventors have found that a porous film comprising a polymer having C=C double bond and an aliphatic ring in its main chain, and another resin exhibits excellent latent heat resistance or heat resistance. The present invention has been accomplished thereby.

Specifically, the present invention relates to:

(1) a porous film comprising a polymer composition comprising (a) a polymer having C=C double bond and an aliphatic ring having 5 to 10 carbon atoms in a main chain thereof; and (b) another resin;

(2) a porous film comprising the (a) polymer and the (b) resin of item (1) above, all or a part of C=C double bond in the (a) polymer being disappeared;

(3) a porous film comprising the (a) polymer and the (b) resin of item (1) above, wherein the (a) polymer and the (b) resin are cross-linked therebetween;

(4) a process for preparing the porous film of item (2) or (3) above, characterized by heat-treating the porous film of item (1) above in the presence of oxygen;
(5) a separator for a battery comprising the porous film of any one of items (1) to (3) above; and
(6) a battery comprising the separator of item (5) above.

BEST MODE FOR CARRYING OUT THE INVENTION

Figure 1:
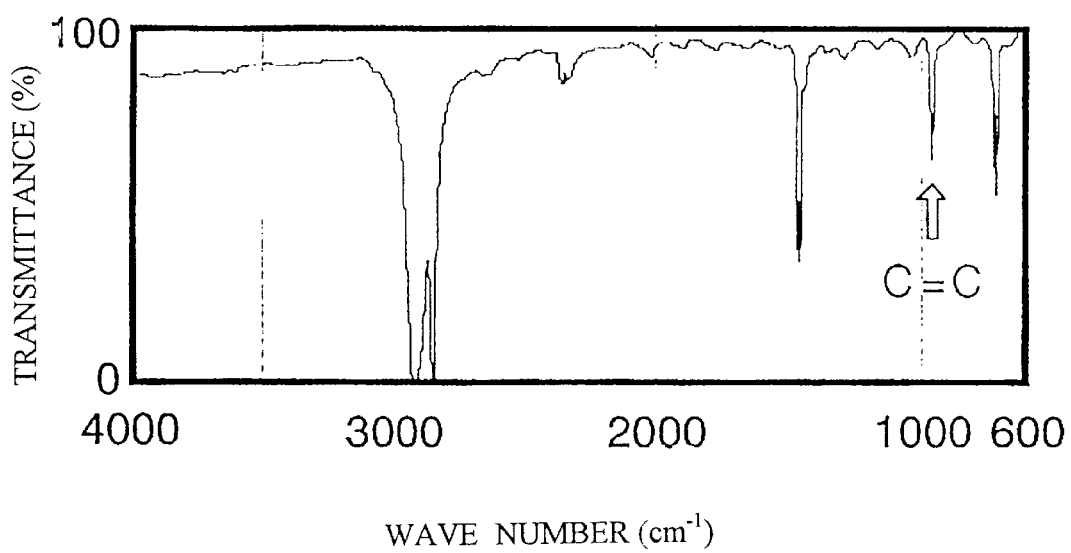
FIG. 1 is an IR chart before heat treatment of a porous film using a norbornene open-ring polymer.

In the present specification, the term "heat resistance" refers to a characteristic in which the limiting temperature for causing breaking of a porous film (heat-resistant temperature of a film at break) is high. In addition, the term "latent heat resistance" refers to a characteristic in which cross-linking or the like is caused when heat-treating a porous film in the presence of oxygen, thereby elevating the heat-resistant temperature of a film at break of the porous film with the passage of time.

In the (a) polymer having C=C double bond and an aliphatic ring having 5 to 10 carbon atoms in a main chain usable in the present invention, the C=C double bond means a double bond formed between carbon atoms. As the aliphatic ring, preferable are ones in which a 5- or 6-member ring is directly bonded to the main chain.

In the present invention, a porous film which is excellent in the latent heat resistance or heat resistance can be obtained by using the (a) polymer described above. In other words, in the present invention, there are provided a porous film having latent heat resistance, which is obtainable by using the (a) polymer; and a porous film having heat resistance, which is obtainable by further subjecting the porous film to a cross-linking treatment.

The (a) polymer mentioned above can be obtained by subjecting an unsaturated condensed alicyclic compound to ring opening polymerization, to give a ring opening polymer in which a double bond and an aliphatic ring ascribed to a monomer compound make up a repeating unit. In addition, in the ring opening polymer obtainable in the manner described above, a part of its double bond may be hydrogenated.

The unsaturated condensed alicyclic compounds mentioned above are roughly classified into the following three series of compounds. A first series of compounds include, among those classified as the condensed alicyclic compounds in a narrow sense, unsaturated compounds one of which rings has a C=C double bond incorporated into the main chain after the ring opening polymerization. In addition, derivatives in which some of hydrogen atoms of these unsaturated compounds are substituted with other substituents can be also used as unsaturated condensed alicyclic compounds. Concrete examples thereof include bicyclo[3.2.0]hept-6-ene, bicyclo[4.2.0]oct-7-ene, and derivatives thereof, and the like.

A second series of compounds include, among those classified as the bridge-ring cyclic compounds, unsaturated compounds one of which rings has a C=C double bond incorporated into the main chain after the ring opening polymerization. In addition, derivatives in which some of hydrogen atoms of these unsaturated compounds are substituted with other substituents can be also used as unsaturated condensed alicyclic compounds. Concrete examples thereof include bicyclo[2.2.1]hept-5-ene (also referred in the present specification as norbornene); norbornene derivatives such as methyl bicyclo[2.2.1]hept-5-ene-2,3-dicarboxylates; bicyclo[2.2.2]oct-2-ene and derivatives thereof, and the like.

A third series of compounds include, compounds having bridge ring and condensed aliphatic ring, each of which compounds has an aliphatic ring and C=C double bond in its main chain after the ring opening polymerization. Concrete examples thereof include tricyclo[5.2. 1.0$^{2.6}$]deca-3,8-diene (dicyclopentadiene), tetracyclododecene, and derivatives thereof, and the like.

Among these unsaturated condensed alicyclic compounds, norbornene and norbornene derivatives are preferable, from the viewpoints of feeding raw materials and the like. In addition, these unsaturated condensed alicyclic compounds can be used alone, or in admixture of two or more kinds, or they can be sequentially subjected to ring opening polymerization.

As the (b) resin, polyolefin-based resins can be preferably used. Examples thereof include polyolefin resins such as polyethylenes and polypropylenes; modified polyolefin resins such as ethylene-acrylic monomer copolymers and ethylene-vinyl acetate copolymers, and the like. In addition, there can be also preferably used elastomers containing an olefinic unit, such as ethylene-propylene rubber, butyl rubber, butadiene rubber, styrene-butadiene rubber, styrene-isoprene block copolymers, and hydrogenated compounds thereof. Also, there can be also used completely hydrogenated compounds of ring opening polymers of the unsaturated condensed alicyclic compounds mentioned above; or addition copolymers of the unsaturated condensed alicyclic compounds mentioned above with other unsaturated compounds such as ethylene. Besides them, there can be used acrylic polymers such as acrylic rubbers, the acrylic polymers containing various kinds of acrylic monomer units; thermoplastic elastomers such as polyester elastomers, polyamide elastomers and polyurethane elastomers, each containing a polyether or polyester unit as a soft segment, and the like. Among them, the polyolefin-based resins are preferable, especially polyethylene-based resins such as ultra-high molecular polyethylenes having a weight-average molecular weight of 500000 or more, from the viewpoint of increasing the strength of the porous film. These (b) resins may be used alone or in admixture of two or more kinds.

The porous film of the present invention comprises a polymer composition comprising the (a) polymer and the (b) resin mentioned above, and the polymer composition is contained in the porous film in an amount of preferably from 60 to 100% by weight, more preferably from 75 to 100% by weight.

The content of the (a) polymer in the polymer composition mentioned above is not particularly limited. The content is preferably from 0.5 to 70% by weight, more preferably from 2 to 50% by weight, from the viewpoint of obtaining a porous film having a satisfactory latent heat resistance or heat resistance, and from the viewpoint of retaining excellent properties of the porous film.

In addition, the content of the (b) resin in the polymer composition is not particularly limited. The content is preferably from 30 to 99.5% by weight, more preferably from 50 to 98% by weight, from the viewpoint of retaining good properties of the porous film. In addition, there may be further added a lubricant, an antioxidant, and the like to the polymer composition.

The preparation of the porous film of the present invention includes various known processes such as dry-type film-forming processes and wet-type film-forming processes, and such treatments as stretching may be carried out during the film formation. The porous film can be prepared by, for instance, mixing a raw material composition containing the (a) polymer and the (b) resin with a solvent; molding the mixture into a sheet-like form, with kneading and melting with heating the mixture; thereafter pressing the molded mixture and stretching it to uniaxial or multiaxial directions; and removing the solvent by extraction.

The solvent includes, for instance, aliphatic or alicyclic hydrocarbons such as nonane, decane, undecane, dodecane, decalin, and liquid paraffins; mineral oil distillates of which boiling points correspond to these hydrocarbons and the like. Non-volatile solvents containing large amounts of alicyclic hydrocarbons such as liquid paraffins are preferable. In addition, it is preferable that the amount of the solvent used is from 60 to 95% by weight of the mixture of the raw material composition and the solvent. The process of kneading the mixture of the raw material composition and the solvent to mold the mixture into a sheet-like form can be carried out by a known process. A sheet-like molded product may be obtained by kneading the mixture in a batch process using a Banbury mixer, a kneader, or the like, and thereafter interposing the mixture between chilled metal plates to rapidly cool the mixture, thereby crystallizing the molded product by rapid cooling. Alternatively, a sheet-like molded product may be obtained by using an extruder equipped with a T die or the like. Here, kneading may be carried out under appropriate temperature conditions, which are not particularly limited. Kneading is preferably carried out at 100° to 200° C.

The thickness of the sheet-like molded product obtained in the manner described above is not particularly limited. The thickness is preferably from 3 to 20 mm, and it may be reduced to from 0.5 to 2 mm by pressing treatment such as heat press. In addition, the temperature of the pressing treatment is preferably from 100° to 140° C.

The method of stretching treatment of the sheet-like molded product mentioned above is not particularly limited. The method may be usual tenter method, rolling method, inflation method or a combination of these methods. In addition, any of the uniaxial stretching, biaxial stretching and the like can be applied. Also, in the case of the biaxial stretching, it may be either vertical and horizontal, simultaneous stretching or sequential stretching. The temperature for the stretching treatment is preferably from 100° to 140° C.

The treatment of removing a solvent is a process of removing a solvent from a sheet-like molded product, thereby forming a microporous structure. For instance, the treatment can be carried out by washing the sheet-like molded product with a dissolving solvent to remove the solvent remaining in the molded product. The dissolving solvent includes easily volatile dissolving solvents including hydrocarbons such as pentane, hexane, heptane and decane; chlorinated hydrocarbons such as methylene chloride and carbon tetrachloride; fluorinated hydrocarbons such as trifluoroethane; and ethers such as diethyl ether and dioxane. These solvents can be used alone or in admixture of two or more kinds. The washing method using the above solvent is not particularly limited. The washing method includes, for instance, a method of immersing a sheet-like molded product in a dissolving solvent to extract away the solvent; a method of showering a solvent to a sheet-like molded product, and the like.

The thickness of the resulting porous film of the present invention is preferably from 1 to 60 $\mu$m, more preferably from 5 to 50 $\mu$m. Its porosity is preferably from 30 to 75%. Its air permeability is preferably from 100 to 2000 seconds/100 cc. Its puncture strength is preferably 350 gf/25 $\mu$m or more.

The heat resistance can be improved by subjecting of the porous film obtained in the manner described above to cross-linking. In other words, the porous film has heat resistance latently. The porous film can be used without any treatments depending upon its use, or alternatively the porous film may be used after improving its heat resistance by positively causing cross-linking reaction as occasion demands. A preferable method of treatment for cross-linking is to heat-treat the porous film in the presence of oxygen.

By the heat treatment described above, all or a part of C=C double bond in the (a) polymer constituting the porous film is disappeared. The proportion of the disappearance of the C=C double bond is properly selected in consideration of the desired heat resistance. The disappearance ratio of from 80 to 100% (calculated on the basis of the size of the peak in IR chart) is preferable.

The disappearance of all or a part of C=C double bond by the heat treatment in the presence of oxygen can be confirmed by the observation of infrared absorption spectroscopy, wherein the disappearance means that the polymer is cross-linked. In addition, from the finding that the absorption of peaks ascribed to C=O, —OH is observed, it is thought that polar groups such as hydroxyl group, an ester group and carboxyl group are formed by the heat treatment mentioned above. For instance, IR charts of before and after the heat treatment of the porous film are respectively shown in FIG. 1 (the porous film of Example 2) and FIG. 2 (the porous film of Example 9), the porous film to be treated being obtained by heat-treating a porous film using a norbornene ring opening polymer and an ultra-high molecular polyethylene (heating the porous film at 80° C. for 10 hours, and additionally heating at 120° C. for 3 hours), thereby cross-linking the polymer.

In addition, it has been found that the fluidity at high temperature is suppressed after the heat treatment in the presence of oxygen by determining the viscoelasticity of the porous film, whereby the formation of some sort of a cross-linking structure is acknowledged.

In addition, the method of the heat treatment mentioned above is not particularly limited. The method may be a one-step heat treatment method in which the heat treatment is carried out at once, or the method may be a multi-step heat treatment in which the heat treatment is firstly carried out at a lower temperature, and thereafter the heat treatment is further carried out at a higher temperature. Alternatively, the method may be a temperature-raising heat treatment method in which the heat treatment is carried out with raising the temperature. It is desired that the treatment is carried out without impairing various original properties of the porous film such as porosity and air permeability. In the case of the one-step heat treatment, although it may depend upon the composition of the porous film, the treatment is preferably carried out at 40° to 140° C. In addition, when starting the heat treatment from a lower temperature, and thereafter raising the treatment temperature, the heat resistance gradually improves along with the cross-linking of the porous film, whereby the porous film can be exposed to high temperatures without impairing its various original properties such as porosity and air permeability by heating. Therefore, in order to complete the heat treatment in a short period of time without impairing the various properties, a multi-step or temperature-raising heat treatment method is preferable.

Although the first heat treatment temperature of the multi-step heat treatment method may depend upon the composition of the porous film, the first heat treatment temperature is preferably from 40° to 90° C. Although the second heat treatment temperature may depend upon the composition of the porous film, the second heat treatment temperature is preferably from 90° to 140° C. In addition, a heat treatment of a third or further steps may be additionally carried out at a further higher temperature in a short period of time as occasion demands. Although the period of time for the heat treatment may depend upon the composition of the porous film, it is preferable that the first heat treatment is carried out for 3 to 48 hours or so, and that the second heat treatment at a higher temperature is carried out for 0.5 to 6 hours or so. In the case of the temperature-raising heat treatment method, the method may be carried out under conditions which are similar to those in the multi-step heat treatment method mentioned above.

The mechanisms for the cross-linking reaction by the heat treatment in the presence of oxygen are complicated, and not necessarily definite. The reasons for the improvement in the heat resistance of the porous film are presumably as follows.

First, it is thought that the structure becomes three-dimensional because a polymer radical caused by action with oxygen is added to a C=C double bond, so that the cross-linking reaction is caused between the (a) polymers themselves or between the (a) polymer and the (b) resin during the addition.

Secondly, it is thought that a double bond in the (a) polymer is disappeared to be converted to a saturated C—C bond, so that the glass transition temperature is greatly raised. For instance, when a polynorbornene is used as the (a) polymer, its glass transition temperature is 35° C. However, when the C=C double bond is hydrogenated to be converted to a saturated C—C bond, the glass transition temperature is raised to one-hundred and several dozen degrees Centigrade. The reason why the glass transition temperature is raised by converting a C=C double bond to a saturated C—C bond is that the compound has an aliphatic ring in its main chain. The elevation in the glass transition temperature described above also is presumably a great factor for having a higher heat resistance in the porous film after the treatment in the present invention as compared to the case of an ordinary cross-linkable rubber (Comparative Examples 2 to 4 described below).

Thirdly, it is thought that polar groups such as hydroxyl group, an ester group and carboxyl group are formed in the porous film by oxidation, contributing to pseudo-cross-linking on these bases, whereby serving as a factor for improving the heat resistance.

It is thought that its heat resistance is greatly improved by intertwining these functions and effects in a complicated manner.

In addition, when the treatment mentioned above is carried out, cross-linking with a known peroxide, cross-linking by radioactive rays such as electron beams, ultraviolet rays and visible light rays may be used as occasion demands together with the cross-linking reaction at the C=C double bond.

In addition, there may be some cases where the porous film is generally subjected to heat setting (thermal fixing) in order to prevent the heat shrinkage. In the present invention, it is possible that the porous film is substantially subjected to heat setting depending upon the treatment conditions by carrying out the heat treatment for the cross-linking treatment as mentioned above. When the heat setting is insufficient, the porous film may be subjected to heat setting by further heating the porous film after the cross-linking treatment, in order to further prevent the heat shrinkage. The heat setting may be carried out at a temperature of, for instance, 110° to 140° C. for 0.5 to 2 hours or so.

The porous film after the cross-linking treatment of the present invention obtained in the manner described above especially has excellent heat resistance with having appropriate thickness, porosity, air permeability and puncture strength in the same manner as those before the treatment. The heat-resistant temperature of a film at break is preferably 170° C. or more, more preferably 200° C. or more. Therefore, the porous film can be not only applied to the separator for a battery, but also preferably used for various filters, separation membranes for electrolytic capacitors, and the like.

In addition, when the porous film before the treatment is used without any treatments as a separator for a battery, the heat resistance is improved by causing the cross-linking reaction by heat generated in the battery, in the same manner as the case where the heat treatment as described above is carried out (the porous film having so-called latent heat resistance). Therefore, the porous film before the treatment can be also used for a separator for a battery or the like. When the porous film of the present invention before the cross-linking treatment or after the treatment is applied to a separator for a battery, the separator has sufficient heat resistance even in the case where the temperature of the battery is raised owing to such causes as over-charging, whereby the short-circuiting between the electrodes can be prevented by retaining its shape at high temperatures. Therefore, according to the present invention, there is provided a battery comprising the separator of the present invention having heat resistance, in which the battery can be expected to have an effect of preventing casualties caused by unusual heat generation of a battery or the like.

The present invention will be described hereinbelow by illustration of the working examples, without intending to limit the present invention to these examples. Here, the properties of the porous films obtained in the following Examples and Comparative Examples were evaluated as follows.

(Infrared Absorption (IR) Spectrum)

Determination was made by using Fourier transformer IR spectrometer "FT/IR-230" manufactured by Nihon Bunko K.K., using a porous film directly as a sample.

(Film Thickness)

Determinations was taken from 1/10000 thickness gauge and from a scanning electromicrograph (magnification: 10000) of a cross section of a porous film.

(Porosity)

Calculated by the following equation, from a weight W (g) per unit area S ($cm^2$) of a film, an average thickness t ($\mu$m) and density d ($g/cm^3$).

$$\text{Porosity } (\%)=(1-(10^4 \times W/S/t/d)) \times 100$$

(Air Permeability)

Determined in accordance with JIS P8117.

(Puncture Strength)

A puncture strength test was carried out by using a penetration testing machine "KES-G5" manufactured by Kato Tech K.K. A maximum load was read off from the resulting load-displacement curve, and defined as a puncture strength. As the needle, one having a diameter of 1 mm and a radius of curvature of a tip end of 0.5 mm was used, and the test was carried out at a speed of 2 cm/second.

(Heat-Resistant Temperature of Film at Break)

Two porous films each having a width of 10 mm were laminated, and one end thereof was fixed at a top of an aluminum frame, the aluminum frame having a distance between the top and a bottom of 50 mm, and the other end was fixed to the bottom of the aluminum frame in such a state that a 100 g load was applied to this end. The sample as prepared above was immersed in a silicone oil (manufactured by Toray Industries, Inc., "TORAY SH200 100CS"), the silicone oil being previously heated to a given temperature, and its state was visually observed to determine a period of time required until the porous film was broken. When the porous film did not break even in 10 minutes or more, measurements were taken by raising the temperature in a 10° C. increment. A maximum temperature at which the porous film did not break even after passage of 10 minutes was defmed as a heat-resistant temperature of a film at break.

EXAMPLE 1

Fifteen parts by weight of a raw material composition composed of 2% by weight of norbornene open-ring polymer powder (manufactured by Nippon Zeon Co., Ltd.; trade name: NORSOREX NB; weight-average molecular weight: 2000000 or more, hereinafter the same), and 98% by weight of an ultra-high molecular polyethylene resin (melting point: 136° C.) having a weight-average molecular weight of 3000000; and 85 parts by weight of a liquid paraffin (solidification point: –15° C.; kinematic viscosity at 40° C.: 59 cst, hereinafter the same) were homogeneously mixed in a slurry state. The resulting mixture was melt-kneaded at a temperature of 160° C. with a twin-screw kneader for 5 minutes, to give a kneaded mixture. The resulting kneaded mixture was molded into a gel-like sheet having a thickness of 5 mm, with rapidly cooling the kneaded mixture.

Next, this sheet was pressed with a heat press at a temperature of 120° C. until its thickness attained to 1 mm. Thereafter, the pressed film was subjected to simultaneous biaxial stretching at a temperature of 125° C. in 4-×4-folds in vertical and horizontal directions, and the stretched film was then immersed in n-heptane to remove the solvent. Subsequently, this porous film was first heat-treated at 85° C. in the air for 6 hours, and thereafter heat-treated at 125° C. in the air for 1 hour, to give a porous film.

EXAMPLE 2

Fifteen parts by weight of a raw material composition composed of 15% by weight of the norbornene open-ring polymer powder, and 85% by weight of the ultra-high molecular polyethylene resin (melting point: 136° C.) having a weight-average molecular weight of 3000000; and 85 parts by weight of the liquid paraffin were homogeneously mixed in a slurry state. The resulting mixture was melt-kneaded at a temperature of 160° C. with a twin-screw kneader for 5 minutes, to give a kneaded mixture. The resulting kneaded mixture was molded into a gel-like sheet having a thickness of 10 mm, with rapidly cooling the kneaded mixture.

Next, this sheet was pressed with a heat press at a temperature of 115° C. until its thickness attained to 1 mm. Thereafter, the pressed film was subjected to simultaneous biaxial stretching at a temperature of 120° C. in 3-×3-folds in vertical and horizontal directions. Subsequently, the stretched film was immersed in n-heptane to remove the solvent, to give a porous film not subjected to a heat treatment under oxygen atmosphere. This porous film was subjected to IR spectroscopy. As a result, as shown in FIG. 1, a peak at 960 cm$^{-1}$ ascribed to C=C double bond was observed.

EXAMPLE 3

The porous film obtained in Example 2 was heat-treated at 80° C. in the air for 3 hours, to give a porous film. This porous film was subjected to IR spectroscopy. As a result, the intensity of the peak at 960 cm$^{-1}$ ascribed to C=C double bond was reduced to about 50% that of the porous film of Example 2. In other words, about 50% of the C=C double bond disappeared by the heat treatment.

EXAMPLE 4

The porous film obtained in Example 2 was first heat-treated at 80° C. in the air for 12 hours, and thereafter heat-treated at 125° C. in the air for 2 hours, to give a porous film. This porous film was subjected to IR spectroscopy. As a result, the peak at 960 cm$^{-1}$ ascribed to C=C double bond was almost completely disappeared. In other words, the C=C double bond was almost completely reacted.

EXAMPLE 5

Twenty parts by weight of a raw material composition composed of 25% by weight of the norbornene open-ring polymer powder, 50% by weight of the ultra-high molecular polyethylene resin (melting point: 136° C.) having a weight-average molecular weight of 3000000, and 25% by weight of an addition copolymer of a norbornene derivative and ethylene (manufactured by Mitsui Chemical, trade name: APEL 6013); and 80 parts by weight of the liquid paraffin were homogeneously mixed in a slurry state. The resulting mixture was melt-kneaded at a temperature of 160° C. with a twin-screw kneader for 5 minutes, to give a kneaded mixture. The resulting kneaded mixture was molded into a gel-like sheet having a thickness of 5 mm, with rapidly cooling the kneaded mixture.

Next, this sheet was pressed with a heat press at a temperature of 115° C. until its thickness attained to 1 mm. Thereafter, the pressed film was subjected to simultaneous biaxial stretching at a temperature of 120° C. in 4-×4-folds in vertical and horizontal directions, and the stretched film was then immersed in n-heptane to remove the solvent. Subsequently, this porous film was first heat-treated at 80° C. in the air for 12 hours, and thereafter heat-treated at 125° C. in the air for 3 hours, to give a porous film.

EXAMPLE 6

Twenty-five parts by weight of a raw material composition composed of 40% by weight of the norbornene open-ring polymer powder and 60% by weight of the ultra-high molecular polyethylene resin (melting point: 136° C.) having a weight-average molecular weight of 3000000; and 75 parts by weight of the liquid paraffin were homogeneously mixed in a slurry state. The resulting mixture was melt-kneaded at a temperature of 160° C. with a kneader for 40 minutes, to give a kneaded mixture. The resulting kneaded mixture was molded into a gel-like sheet having a thickness of 5 mm, with rapidly cooling the kneaded mixture.

Next, this sheet was pressed with a heat press at a temperature of 115° C. until its thickness attained to 1 mm. Thereafter, the pressed film was subjected to simultaneous biaxial stretching at a temperature of 120° C. in 4-×4-folds in vertical and horizontal directions, and the stretched film was then immersed in n-heptane to remove the solvent.

Subsequently, this porous film was first heat-treated at 85° C. in the air for 12 hours, and thereafter heat-treated at 125° C. in the air for 3 hours, to give a porous film.

EXAMPLE 7

Thirty parts by weight of a raw material composition composed of 55% by weight of the norbornene open-ring polymer powder and 45% by weight of the ultra-high molecular polyethylene resin (melting point: 136° C.) having a weight-average molecular weight of 3000000; and 70 parts by weight of the liquid paraffin were homogeneously mixed in a slurry state. The resulting mixture was melt-kneaded at a temperature of 160° C. with a kneader for 40 minutes, to give a kneaded mixture. The resulting kneaded mixture was molded into a gel-like sheet having a thickness of 5 mm, with rapidly cooling the kneaded mixture.

Next, this sheet was pressed with a heat press at a temperature of 115° C. until its thickness attained to 1 mm. Thereafter, the pressed film was subjected to simultaneous biaxial stretching at a temperature of 120° C. in 4-×4-folds in vertical and horizontal directions, and the stretched film was then immersed in n-heptane to remove the solvent.

Subsequently, this porous film was first heat-treated at 85° C. in the air for 12 hours, and thereafter heat-treated at 125° C. in the air for 3 hours, to give a porous film.

EXAMPLE 8

Thirty parts by weight of a raw material composition composed of 65% by weight of the norbornene open-ring polymer powder and 35% by weight of the ultra-high molecular polyethylene resin (melting point: 136° C.) having a weight-average molecular weight of 3000000; and 70 parts by weight of the liquid paraffin were homogeneously mixed in a slurry state. The resulting mixture was melt-kneaded at a temperature of 160° C. with a kneader for 40 minutes, to give a kneaded mixture. The resulting kneaded mixture was molded into a gel-like sheet having a thickness of 5 mm, with rapidly cooling the kneaded mixture.

Next, this sheet was pressed with a heat press at a temperature of 115° C. until its thickness attained to 0.5 mm. Thereafter, the pressed film was subjected to simultaneous biaxial stretching at a temperature of 115° C. in 2-×2-folds in vertical and horizontal directions, and the stretched film was then immersed in n-heptane to remove the solvent.

Subsequently, this porous film was first heat-treated at 85° C. in the air for 24 hours, and thereafter heat-treated at 115° C. in the air for 5 hours, to give a porous film.

EXAMPLE 9

Figure 2:
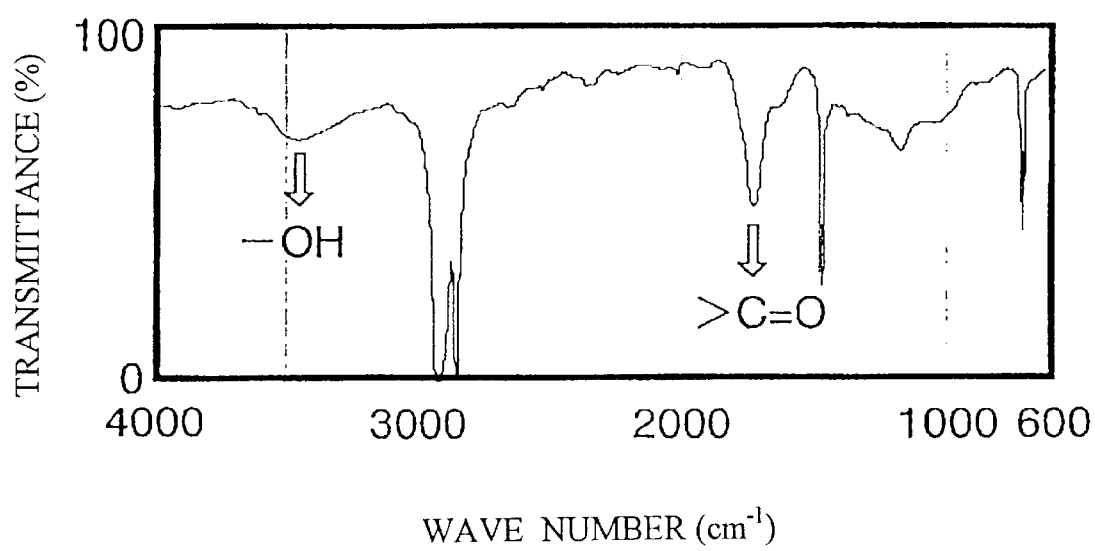
FIG. 2 is an IR chart after heat treatment of a porous film using a norbornene open-ring polymer.

The porous film obtained in Example 2 was first heat-treated at 80° C. in the air for 10 hours, and thereafter heat-treated at 120° C. in the air for 3 hours, to give a porous film. This porous film was subjected to IR spectroscopy. As a result, as shown in FIG. 2, the peak at 960 cm$^{-1}$ ascribed to C=C double bond was almost completely disappeared. In other words, the C=C double bond was almost completely reacted.

Comparative Example 1

The same procedures as in Example 1 were carried out except for using only 100% by weight of the ultra-high molecular polyethylene resin (melting point: 136° C.) having a weight-average molecular weight of 3000000, without using the norbornene open-ring polymer in Example 1, to give a porous film.

Comparative Example 2

The same procedures as in Example 2 were carried out except for using 15% by weight of ethylene-propylene rubber (manufactured by JSR; "EP01P," hereinafter the same) in place of the norbornene open-ring polymer in Example 2, to give a porous film.

Comparative Example 3

The procedures were carried out under the same conditions as in Example 3 including the heat treatment in the presence of oxygen, except for using 15% by weight of the ethylene-propylene rubber in place of the norbornene open-ring polymer in Example 3, to give a porous film.

Comparative Example 4

The procedures were carried out under the same conditions as in Example 4 including the heat treatment in the presence of oxygen, except for using 15% by weight of the ethylene-propylene rubber in place of the norbornene open-ring polymer in Example 4, to give a porous film.

The thickness, the porosity, the air permeability, the puncture strength, and the heat-resistant temperature of a film at break of the porous films obtained in Examples 1 to 9 and Comparative Examples 1 to 4 are shown in Table 1, respectively.

It is seen from the results of Table 1 that each of the porous films obtained in Examples 1 to 9 has appropriate porosity, air permeability and puncture strength, and that especially each of the porous films obtained in Example 1 and 3 to 9 subjected to the heat treatments has a high heat-resistant temperature of a film at break, as compared with those of the porous films obtained in Comparative Examples 1 to 4. In addition, as is seen in comparison of that in Example 2 with those further subjected to heat treatments in Examples 3, 4 and 9, a latent heat resistance was found in the porous film in Example 2.

TABLE 1

|  | Thickness (μm) | Porosity (%) | Air Permeability (sec/100 cc) | Puncture Strength (gf/25 μm) | Heat-Resistant Temp of Film at Break (° C.) | Heat-Treatment Conditions (Cross-Linking Treatment) |
| --- | --- | --- | --- | --- | --- | --- |
| Example 1 | 26 | 65 | 197 | 510 | 170 | After heat treatment |
| Example 2 | 52 | 63 | 380 | 790 | 150 | Untreated |

TABLE 1-continued

|  | Thickness (μm) | Porosity (%) | Air Permeability (sec/100 cc) | Puncture Strength (gf/25 μm) | Heat-Resistant Temp of Film at Break (° C.) | Heat-Treatment Conditions (Cross-Linking Treatment) |
|---|---|---|---|---|---|---|
| Example 3 | 45 | 58 | 440 | 800 | 170 | 50% Treatment |
| Example 4 | 42 | 54 | 470 | 820 | 220 | After heat treatment |
| Example 5 | 24 | 42 | 490 | 440 | >240 | After heat treatment |
| Example 6 | 23 | 39 | 620 | 460 | >240 | After heat treatment |
| Example 7 | 20 | 35 | 750 | 420 | >240 | After heat treatment |
| Example 8 | 19 | 33 | 1500 | 400 | >240 | After heat treatment |
| Example 9 | 42 | 54 | 470 | 820 | 220 | After heat treatment |
| Comparative Example 1 | 25 | 67 | 185 | 515 | <150 | After heat treatment |
| Comparative Example 2 | 40 | 50 | 500 | 700 | 150 | Untreated |
| Comparative Example 3 | 40 | 35 | 3000 | 700 | 150 | 50% Treatment |
| Comparative Example 4 | 40 | 20 | >5000 | 700 | 150 | After heat treatment |

INDUSTRIAL APPLICABILITY

According to the present invention, there is provided a porous film having appropriate porosity, air permeability and strength, and being excellent in latent heat resistance or heat resistance. In addition, there can be obtained a separator for a battery being excellent in heat resistance which does not break even under high temperatures, and a battery comprising the separator, by using the porous film for a separator for a battery such as a battery for electric automobiles.

What is claimed is:

1. A porous film comprising a polymer composition comprising (a) a polymer having C=C double bond and an aliphatic ring having 5 to 10 carbon atoms in a main chain thereof; and (b) an ultra-high molecular polyethylene having a weight-average molecular weight of 500000 or more, wherein said polymer (a) and said ultra-high molecular polyethylene (b) are crosslinked therebetween.

2. The porous film according to claim 1, wherein said (a) polymer is a ring opening polymer of an unsaturated condensed alicyclic compound.

3. The porous film according to claim 2, wherein said unsaturated condensed alicyclic compound is norbornene or a norbornene derivative.

4. The porous film according to claim 1, wherein a content of said (a) polymer is 0.5 to 70% by weight, and wherein a content of said ultra-high molecular polyethylene (b) is 30 to 99.5% by weight, in the polymer composition.

5. A porous film comprising said (a) polymer and said ultra-high molecular polyethylene (b) of claim 1, all or a part of C=C double bond in said (a) polymer being disappeared.

6. The porous film according to claim 5, wherein all or a part of C=C double bond in a norbornene ring opening polymer is disappeared.

7. The porous film according to claim 1, wherein a norbornene ring opening polymer and said ultra-high molecular polyethylene are cross-linked therebetween.

8. A process for preparing the porous film of any one of claims 5, 6 and 7, characterized by heat-treating the porous film of claim 1 in the presence of oxygen.

9. A separator for a battery comprising the porous film of claim 1.

10. A battery comprising the separator of claim 9.

11. The porous film according to claim 1, wherein said porous film has a puncture strength of at least 350 gf/25 μm.

12. The porous film according to claim 1, wherein the porous film has an air permeability of 100 to 2,000 seconds/ 100 cc.

* * * * *